United States Patent
Ramaiyer

(10) Patent No.: US 11,042,569 B2
(45) Date of Patent: Jun. 22, 2021

(54) SYSTEM AND METHOD FOR LOAD, AGGREGATE AND BATCH CALCULATION IN ONE SCAN IN A MULTIDIMENSIONAL DATABASE ENVIRONMENT

(71) Applicant: ORACLE INTERNATIONAL CORPORATION, Redwood Shores, CA (US)

(72) Inventor: Kumar Ramaiyer, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 9 days.

(21) Appl. No.: 16/023,812

(22) Filed: Jun. 29, 2018

(65) Prior Publication Data
US 2019/0102446 A1    Apr. 4, 2019

Related U.S. Application Data

(60) Provisional application No. 62/565,519, filed on Sep. 29, 2017.

(51) Int. Cl.
| | |
|---|---|
| *G06F 16/00* | (2019.01) |
| *G06F 16/28* | (2019.01) |
| *G06F 16/22* | (2019.01) |
| *G06F 16/25* | (2019.01) |

(52) U.S. Cl.
CPC ........ *G06F 16/283* (2019.01); *G06F 16/2246* (2019.01); *G06F 16/2264* (2019.01); *G06F 16/254* (2019.01); *G06F 16/282* (2019.01)

(58) Field of Classification Search
CPC combination set(s) only.
See application file for complete search history.

(56) References Cited

U.S. PATENT DOCUMENTS

| | | | |
|---|---|---|---|
| 5,574,952 A | 11/1996 | Brady | |
| 5,864,857 A * | 1/1999 | Ohata | ............... G06F 16/2264 |

(Continued)

FOREIGN PATENT DOCUMENTS

| | | |
|---|---|---|
| JP | H09265479 A | 10/1997 |
| JP | H10301935 A | 11/1998 |

(Continued)

OTHER PUBLICATIONS

Chen, et al. "Training Deep Nets with Sublinear Memory Cost", Cornell University Library, Ithaca, NY, Apr. 21, 2016, 12 pages.

(Continued)

*Primary Examiner* — Farhan M Syed
(74) *Attorney, Agent, or Firm* — Tucker Ellis LLP

(57) ABSTRACT

In accordance with an embodiment, systems and methods can provide for load, aggregate, and batch calculation in a multidimensional database environment. Metadata can be used to identify in which higher dimensions each leaf-level load is used. At such time, the data from the leaf level is aggregated to each of the higher dimensions where it is to be used. Then, the aggregate values are stored in memory until a completed sum (or other calculation) is completed at the higher levels. At such time, the aggregate values can be discarded from memory. The ability of the system to perform a load, aggregate, and batch calculation in one scan is particularly useful in processing very large sets of data, for example in big data environments, where it may not be desirable to load the data for all of the leaf nodes into current memory.

17 Claims, 7 Drawing Sheets

(56) References Cited

U.S. PATENT DOCUMENTS

| | | | |
|---|---|---|---|
| 5,915,129 A | 6/1999 | Slivka | |
| 6,161,105 A | 12/2000 | Keighan | |
| 6,574,720 B1 | 6/2003 | Hopeman | |
| 6,629,102 B1 | 9/2003 | Malloy | |
| 6,766,325 B1 | 7/2004 | Pasumansky | |
| 7,133,876 B2* | 11/2006 | Roussopoulos | G06F 16/283 |
| | | | 707/752 |
| 7,392,242 B1 | 6/2008 | Baccash | |
| 8,156,083 B2 | 4/2012 | Banerjee | |
| 10,083,195 B2 | 9/2018 | Zhou | |
| 10,318,498 B2 | 6/2019 | Tran | |
| 10,346,435 B2 | 7/2019 | Walker | |
| 10,360,527 B2* | 7/2019 | Abe | G06Q 10/067 |
| 10,467,251 B2 | 11/2019 | Menon | |
| 2002/0029207 A1 | 3/2002 | Bakalash | |
| 2002/0194163 A1* | 12/2002 | Hopeman | G06F 16/283 |
| 2003/0005420 A1 | 1/2003 | Ghosh | |
| 2004/0054858 A1 | 3/2004 | Chandrasekaran | |
| 2005/0071349 A1 | 3/2005 | Jordan | |
| 2005/0262108 A1* | 11/2005 | Gupta | G06F 16/2358 |
| 2006/0010159 A1 | 1/2006 | Mirchandani | |
| 2006/0085742 A1 | 4/2006 | Harold | |
| 2006/0106769 A1 | 5/2006 | Gibbs | |
| 2006/0212672 A1 | 9/2006 | Chandrasekaran | |
| 2006/0271568 A1 | 11/2006 | Balkir | |
| 2007/0027674 A1 | 2/2007 | Parson | |
| 2007/0061344 A1 | 3/2007 | Dickerman | |
| 2007/0088691 A1 | 4/2007 | Dickerman | |
| 2007/0094668 A1 | 4/2007 | Jacquot | |
| 2008/0288524 A1 | 11/2008 | Dumitru | |
| 2009/0030915 A1 | 1/2009 | Winter | |
| 2009/0037499 A1 | 2/2009 | Muthulingam | |
| 2009/0248651 A1 | 10/2009 | Perry | |
| 2009/0249125 A1 | 10/2009 | Bhatawdekar | |
| 2009/0276705 A1 | 11/2009 | Ozdemir | |
| 2010/0174879 A1 | 7/2010 | Pawar | |
| 2012/0116850 A1* | 5/2012 | Abe | G06Q 10/067 |
| | | | 705/7.38 |
| 2012/0296883 A1 | 11/2012 | Ganesh | |
| 2014/0046920 A1 | 2/2014 | Shuma | |
| 2014/0052764 A1 | 2/2014 | Michael | |
| 2014/0122413 A1 | 5/2014 | Presti | |
| 2015/0186500 A1 | 7/2015 | Rope | |
| 2016/0232207 A1 | 8/2016 | Brunel | |
| 2017/0116032 A1 | 4/2017 | Tran | |
| 2017/0116215 A1 | 4/2017 | Ramaiyer | |
| 2017/0116281 A1 | 4/2017 | Roytman | |
| 2017/0116290 A1 | 4/2017 | Reichman | |
| 2017/0116309 A1 | 4/2017 | Menon | |
| 2017/0116310 A1 | 4/2017 | Walker | |
| 2017/0116311 A1 | 4/2017 | Reichman | |
| 2017/0116312 A1 | 4/2017 | Reichman | |
| 2017/0116313 A1 | 4/2017 | Roytman | |
| 2017/0308315 A1 | 10/2017 | Wang | |
| 2019/0073366 A1 | 3/2019 | Raimaiyer | |
| 2019/0079959 A1 | 3/2019 | Raimaiyer | |
| 2019/0102445 A1* | 4/2019 | Ramaiyer | G06F 16/282 |
| 2019/0102446 A1* | 4/2019 | Ramaiyer | G06F 16/2264 |
| 2019/0102447 A1* | 4/2019 | Ramaiyer | G06F 16/254 |
| 2019/0258612 A1* | 8/2019 | Tran | G06F 9/5061 |
| 2019/0286638 A1* | 9/2019 | Walker | G06F 12/121 |

FOREIGN PATENT DOCUMENTS

| | | | |
|---|---|---|---|
| JP | 2006065797 A | 3/2006 | |
| JP | 2007052754 A | 3/2007 | |

OTHER PUBLICATIONS

Marchal, et al. "Scheduling tree-shaped task graphs to minimize memory and makespan", 2013 IEEE 27th International Symposium on Parallel & Distributed Processing, May 20, 2013, pp. 839-850, 12 pages.

Notification of Transmittal of the International Search Report and the Written Opinion of the International Searching Authority for PCT Application No. PCT/US2018/044425, dated Oct. 18, 2018, 12 pages.

Sethi, Ravi, "Complete Register Allocation Problems", Siam Journal on Computing, Society for Industrial and Applied Mathematics, vol. 4, No. 3, Sep. 1, 1975, pp. 226-248, 24 pages.

Vivien, et al., "Scheduling tree-shaped task graphs to minimize memory and makespan", CCDSC 2014, Sep. 2014, 64 pages.

Xin, et al. "Star-Cubing: Computing Iceberg Cubes by Top-Down and Bottom-Up Integration", Proceedings of the 29th International Conference on Very Large Databases, Sep. 9-12, 2003, pp. 476-487, 12 pages.

Iankovszky, Andra et al., Edgewater Ranzal, Oracle Platinum Consulting Partner, "The Uncharted Territory Ready to be Discovered: Hybrid Essbase", Hyperion UKOUG, Jun. 18, 2015, 24 pages.

Russakovsky, Alexander; "Hopping over Big Data: Accelerating Ad-hoc OLAP Queries with Grasshopper Algorithms" published Feb. 26, 2015, 30 pages.

Dynamic Flow process definition Nov. 26, 2018, google.com, https://www.google.com/search?biw=1920&bih=1076&ei=njv8W_CJD4mizwK_l4gCQ&q=%22dynamic+flow+process%22+definition&oq=%22dynamic+flow+process%22+definition&gs l=psy-ab .3 ... 38876 .39886 .. 40199 ... 0 .0 .. 0. 76.437 .8 ...... 0 .... 1 .. gws-. viz ....... Oi71j0i7i30j0i30j0i8i30.

Dynamic Flow process OLAP Nov. 26, 2018, google.com, https://www.google.com/search?biw=1920&bih=1076&ei=njv8W_CJD4mizwK_l4gCQ&q=%22dynamic+flow+process%22+definition&oq=%22dynamic+flow+process%22+definition&gs l=psy-ab .3 ... 38876 .39886 .. 40199 ... 0 .0 .. 0. 76.437 .8 ...... 0 .... 1 .. gws-. viz ....... Oi71j0i7i30j0i30j0i8i30j33i10.

PerformanceArchHowTo, Aggregate Storage Option ASO vs Block Storage Option BSO Contrast and Comparison Aug. 24, 2011, youtube.com, https://www.youtube.com/watch?v=i8AeH5UGT90.

Oracle©, Oracle Enterprise Performance Management System Documentation, Release 11.1.2.4/ Essbase, Database Administrator's Guide, Developing Formulas for Block Storage Databases, Copyright © 2019, 28 pages.

Larimer, Mike et al., Oracle, OAC Essbase Hybrid Block Storage Option Performance Tuning, White Paper, Oracle©, Jun. 11, 2018, 24 pages.

Oracle, Oracle® Cloud, Oracle Cloud Administering Oracle Essbase Cloud, Copyright © 1996, 2016, 632 pages.

Oracle, Oracle® Cloud, Administering Oracle Analytics Cloud—Essbase, Copyright © 1996, 2017, 703 pages.

Essbase Information Development Team, Oracle® Cloud, Technical Reference for Oracle Analytics Cloud—Essbase, E70189-04, Sep. 2017, Copyright © 1996, 2017, 1044 pages.

EPM Information Development Team, Oracle® Essbase Release 11.1.1, Database Administrator's Guide, Copyright © 1996, 2008, 1182 pages.

EPM Information Development Team, Oracle® Essbase, Technical Reference, Release 11.1.2.2.100, Copyright © 1996, 2012, 1402 pages.

EPM Information Development Team, Oracle® Essbase Database Administrator's Guide, Release 11.1.2.2.100, Updated Dec. 2013, Copyright © 1996, 2013, 1138 pages.

Turrell, Jake, "Introduction to Essbase Hybrid Aggregation Mode", Mar. 4, 2015, 12 pages, retreived on Jan. 15, 2020 from: <http://turrellconsulting.com/blog/?s=introduction+to+essbase+hybrid+aggregation+mode&searchsubmit=U>.

Driscoll, James R. et al., "Making Data Structures Persistent", Journal of Computer and System Sciences, vol. 38, No. 1, Feb. 1989, Printed in Belgium, Copyright © 1989, 39 pages.

Oracle, EPM Information Development Team, Oracle® Integrated Operational Planning, Fusion Edition Release 4.0.1 Installation Guide, Copyright © 2001, 2009, 18 pages.

Oracle, EPM Information Development Team, Oracle® Integrated Operational Planning, Fusion Edition Release 4.0.1 User's Guide, Copyright © 2004, 2009, 272 pages.

Japan Patent Office, Notice of Reasons for Refusal (Translated) dated Sep. 8, 2020 for Japanese Patent Application No. 2019-552229, 6 pages.

Intellectual Property India, India Patent Office, Examination Report under sections 12 & 13 of the Patents Act, 1970 and the Patents Rules, 2003 dated Apr. 20, 2021 for Indian Application No. 201947023965, 7 pages.

* cited by examiner

SYSTEM AND METHOD FOR LOAD, AGGREGATE AND BATCH CALCULATION IN ONE SCAN IN A MULTIDIMENSIONAL DATABASE ENVIRONMENT

CLAIM OF PRIORITY

This application claims priority to U.S. Provisional Patent Application entitled "SYSTEM AND METHOD FOR LOAD, AGGREGATE AND BATCH CALCULATION IN ONE SCAN IN A MULTIDIMENSIONAL ENVIRONMENT", Application No. 62/565,519, filed on Sep. 29, 2017, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to databases and data warehousing, and are particularly related to a system and method for load, aggregate and batch calculation in one scan in a multidimensional database environment.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, systems and methods can provide for load, aggregate, and batch calculation in one scan in a multidimensional database environment. An exemplary method can provide, at a computer that includes one or more microprocessors, a multidimensional database server executing on the computer, wherein the multidimensional database server supports at least one hierarchical structure of data dimensions. The method can organize the at least one hierarchical structure of data dimensions into a plurality of levels, each of the plurality of levels comprising a subset of a plurality of nodes. The method can load a source data into a leaf node of the plurality of nodes, the leaf node being at a lowest level of the plurality of levels, the leaf node being associated with one or more nodes of a higher level, wherein such association comprises metadata. Upon loading the source data into the leaf node, the method can aggregate the source data to the one or more nodes of higher level. Upon aggregating the source data to the one or more nodes of the higher level, the method can associate the aggregations of the source data are associated with the metadata. Upon associating the aggregations of the source data with the metadata, the method can discard the source data loaded into the leaf node.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
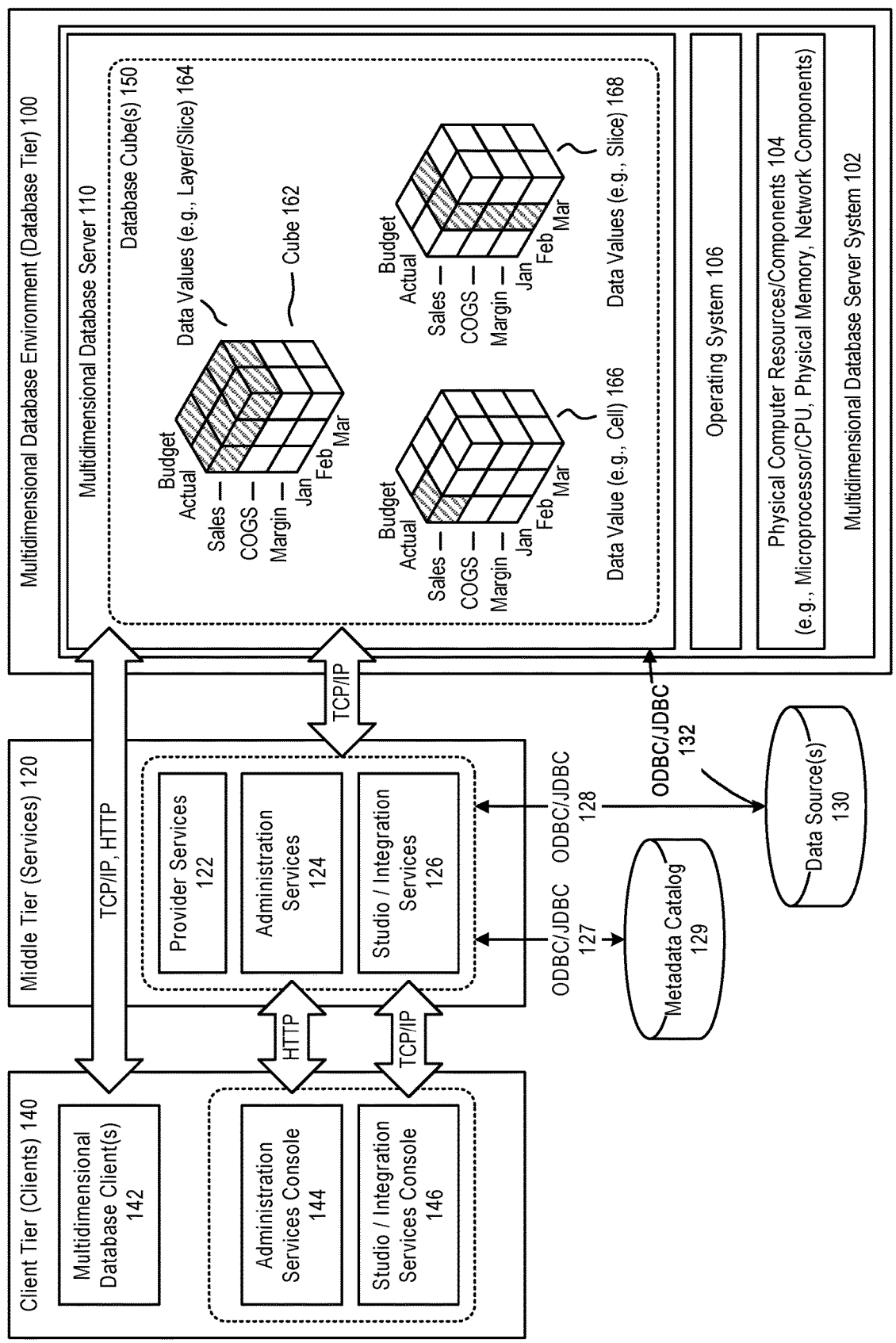
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

In accordance with an embodiment, OLAP systems can organize data in multiple dimensions allows searchers/users of the data set to conduct directed searches that traverse various dimensions to ultimately arrive at the result of interest. OLAP systems can view data as residing at the intersection of dimensions. Put another way, the data underlying OLAP systems can be organized and stored as a multi-dimensional database which is an instantiation of the cross-product of all of the dimensions. This allows users/searchers to traverse hierarchies of detail along dimensions of interest in an ad hoc manner to get at specific, targeted data. Slowly changing data can be represented as metadata within a current data set.

Load, Aggregate, and Batch Calculation

In accordance with an embodiment, metadata can be used to identify in which higher dimensions each leaf-level load is used. At such time, the data from the leaf level is aggregated to each of the higher dimensions where it is to be used. Then, the aggregate values are stored in memory until a completed sum (or other calculation) is completed at the higher levels. At such time, the aggregate values can be discarded from memory.

The ability of the system to perform a load, aggregate, and batch calculation in one scan is particularly useful in processing very large sets of data, for example in big data environments, where it may not be desirable to load the data for all of the leaf nodes into current memory.

For example, a source (e.g., Spark cluster) can have certain values loaded at the leaf level nodes. Data loaded into the leaf node closest to the source can be loaded, then aggregated into the first two dimensions at the next level. This aggregation reduces the loaded data by a factor of 10 to 100×. At this next level, then, the aggregated data can be maintained in memory as a partial sum until the computation is completed.

Figure 2:
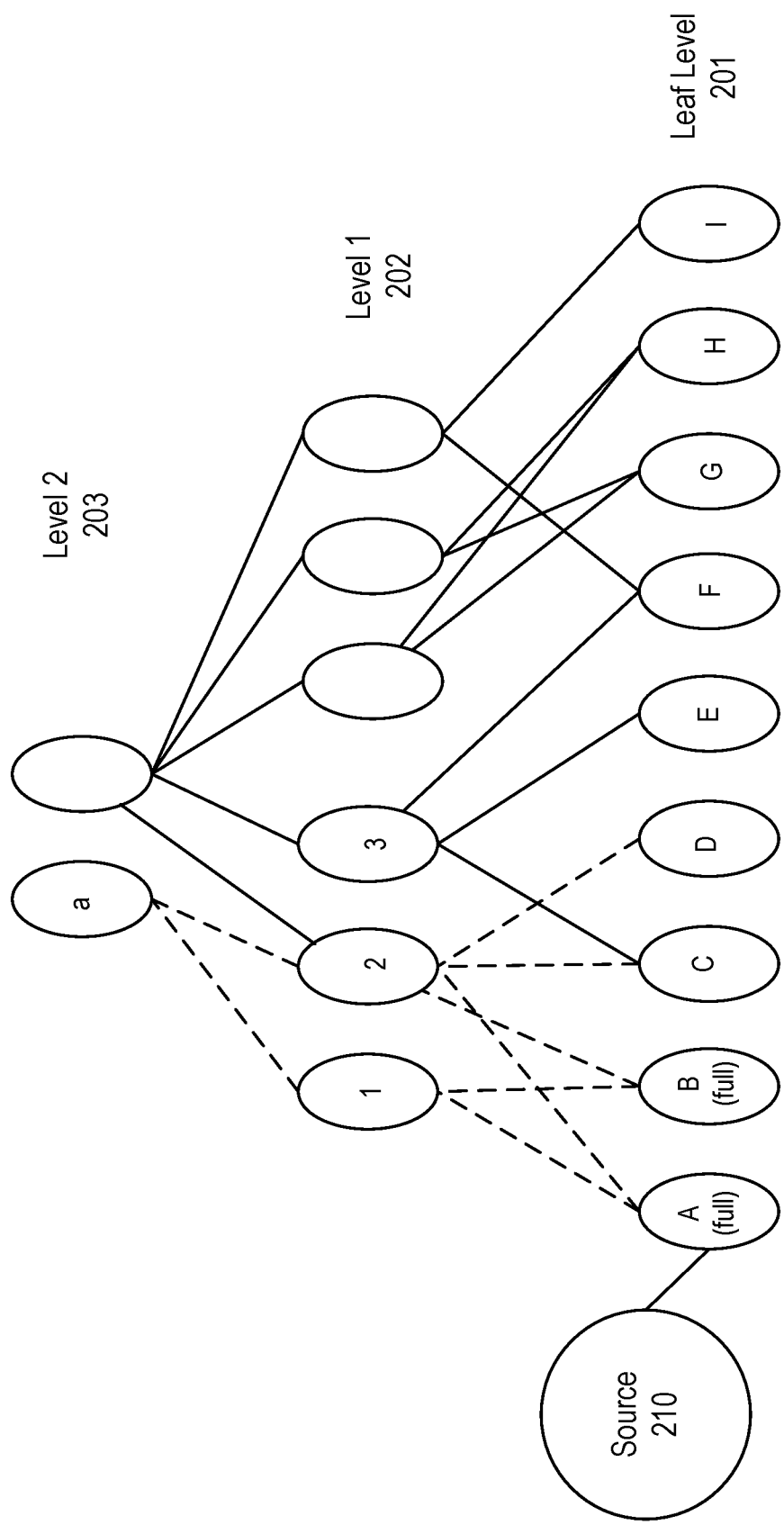
FIG. 2 illustrates a system for load, aggregate, and batch calculation in one scan in a multidimensional database environment, in accordance with an embodiment.

FIG. 2 illustrates a system for load, aggregate, and batch calculation in one scan in a multidimensional database environment, in accordance with an embodiment.

In accordance with an embodiment, as shown in the FIG. 2, a data structure, such a multidimensional database structure, can comprise a number of node levels, such as a leaf level 201, level 1 202, and level 2 203, where each node level comprises one or more nodes. The multidimensional database structure can be associated with a source 210, such as a data source (e.g., a big data warehouse).

In accordance with an embodiment, the multidimensional data structure can be associated with one or more storage(s) (not shown). For example, one storage device can hold the entirety of the data structure. Alternatively, each level of nodes can be hosted on separate data storages. Alternately, each node can be associated with its one data storage(s).

Although shown with only three levels, FIG. 2 is intended to represent a system that may have more or fewer levels of nodes. Additionally, while only one data source is depicted, multiple data sets can be incorporated into such a system.

In accordance with an embodiment, since data sources are becoming larger and larger, multiple terabytes or even petabytes of data can often be included in a source data set.

In accordance with an embodiment, metadata can be associated with the dimensions (e.g., along links). This metadata can indicate node relationships, such as which nodes are dependent upon which other nodes for various calculations (e.g., partial sum values . . . etc.). This is show, for example, in FIG. 2 with dashed lines representing metadata relationships for the calculation that takes place at node a in level 2 203.

In accordance with an embodiment, however, because of the size of data sources are becoming larger, it is becoming increasingly difficult to persist data at a leaf node level due to the ever increasing size of the data sources used, for example in big data environments.

For example, as shown in FIG. 2, if source data is stored at leaf nodes A and B at the leaf level 201, this could represent the entire amount of storage available for data structure, leaving the data structure only able to complete, perhaps, one or two intermediate calculations (e.g., aggregations) at level 1.

In accordance with an embodiment, in addition, if, on the other hand, two leaf nodes were filled from a source, and the two leaf nodes did not have any common calculations or aggregation points, then the data structure would not be able to perform any calculations as it could no longer pull in further source data into other nodes at the leaf level.

Figure 3:
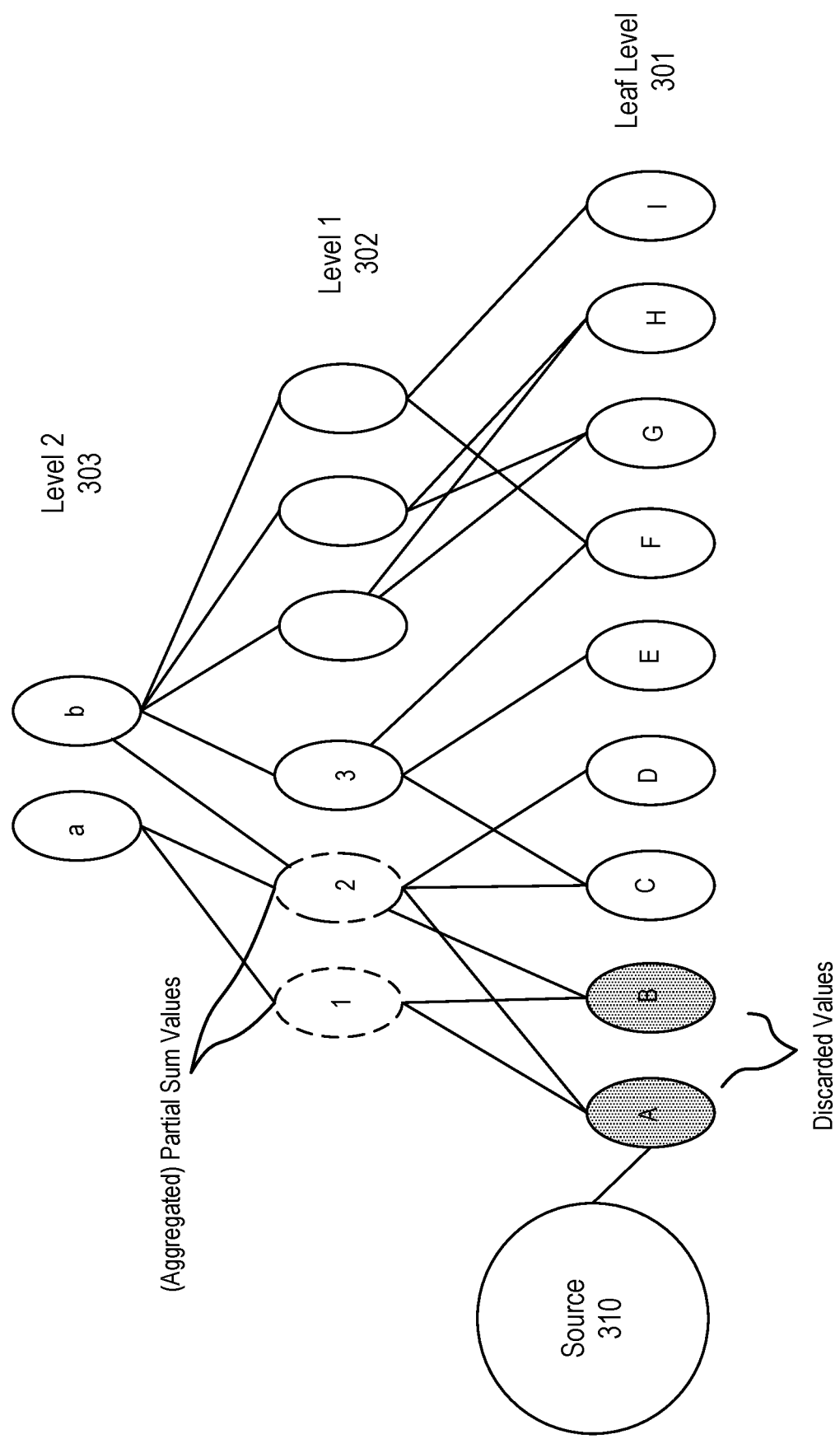
FIG. 3 illustrates a system for load, aggregate, and batch calculation in one scan in a multidimensional database environment, in accordance with an embodiment.

FIG. 3 illustrates a system for load, aggregate, and batch calculation in one scan in a multidimensional database environment, in accordance with an embodiment.

In accordance with an embodiment, as shown in FIG. 3, a data structure, such a multidimensional database structure, can comprise a number of node levels, such as a leaf level 301, level 1 302, and level 2 303, where each node level can comprise one or more nodes. The multidimensional database structure can be associated with a source 310, such as a data source (e.g., a big data warehouse).

In accordance with an embodiment, as shown in FIG. 3, source data is loaded into leaf nodes (in this case, nodes A and B), and then aggregated up to a higher level, where such data can be kept as a partial sum in nodes at level 1.

For example, source data can be loaded into node A. Such source data can then be aggregated up into nodes 1 and 2 at level 1 (based upon the metadata relationships existing between node A and nodes 1 and 2), where such aggregations can be maintained as a partial sum values.

In accordance with an embodiment, after such source data has been aggregated from node A, the source data in node A can be discarded (indicated by the greyed out node) in order to ensure space for loading source data into additional nodes at the leaf level.

Further, in this example, source data can be loaded into node B. Such source data can then be aggregated up into nodes 1 and 2 at level 1 (based upon the metadata relationships existing between node B and nodes 1 and 2—shown by the dashed lines), where such aggregations can be maintained as a partial sum values.

In accordance with an embodiment, after such source data has been aggregated from node B, the source data in node B can be discarded (indicated by the greyed out node) in order to ensure space for loading source data into additional nodes at the leaf level.

In accordance with an embodiment, then, after such processes have completed at nodes A and B at the leaf level, a completed aggregation calculation can be stored in node 1 and level 1, as it has received the aggregations from the two nodes on which it depends. Conversely, the aggregation calculation in node 2 at level 1 is not completed as it has not received aggregations from all of the nodes from which it depends, namely nodes C and D in addition to the received aggregations form nodes A and B.

Figure 4:
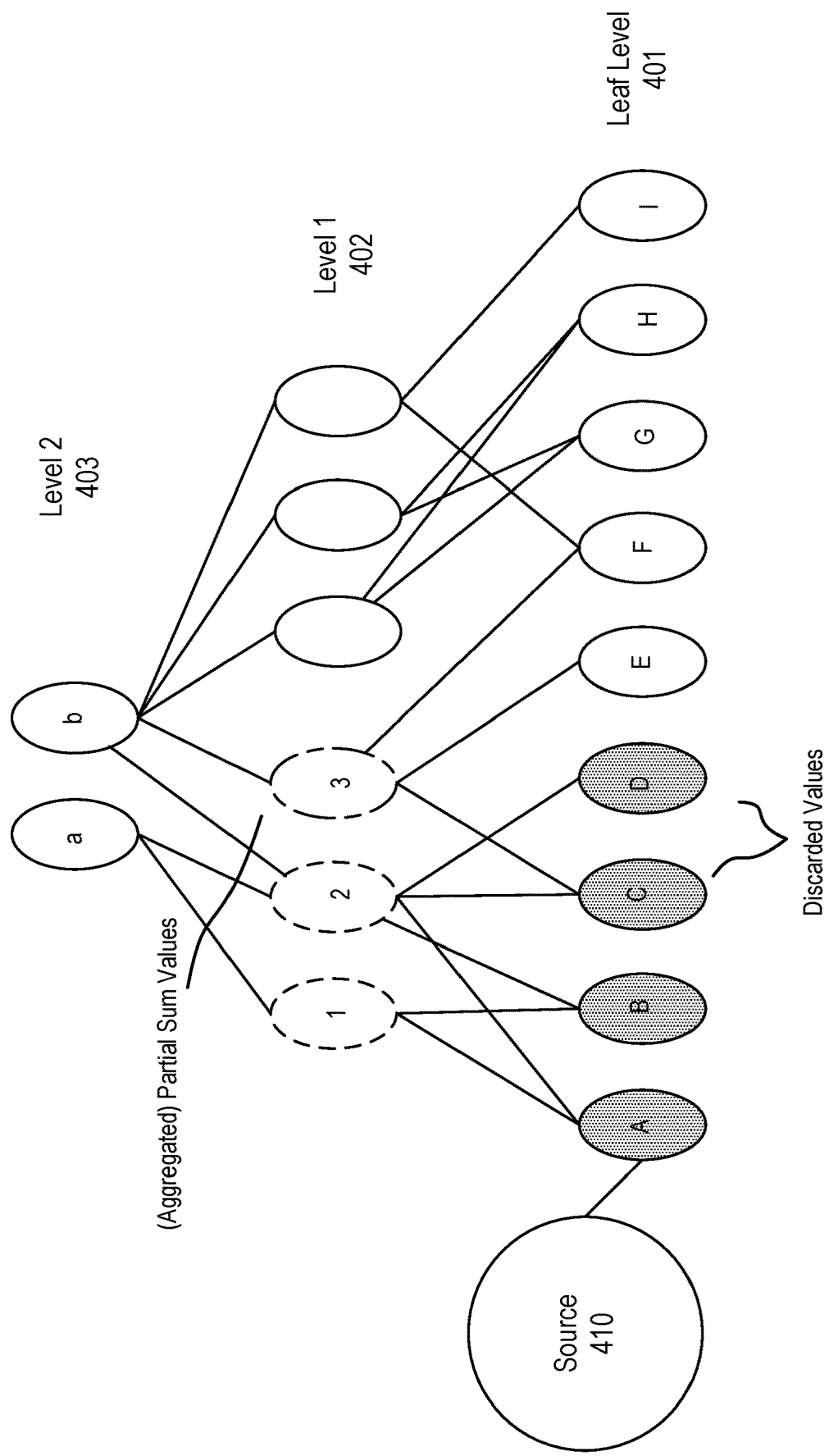
FIG. 4 illustrates a system for load, aggregate, and batch calculation in one scan in a multidimensional database environment, in accordance with an embodiment.

FIG. 4 illustrates a system for load, aggregate, and batch calculation in one scan in a multidimensional database environment, in accordance with an embodiment.

In accordance with an embodiment, as shown in FIG. 4, a data structure, such a multidimensional database structure, can comprise a number of node levels, such as a leaf level 401, level 1 402, and level 2 403, where each node level can comprise one or more nodes. The multidimensional database structure can be associated with a source 410, such as a data source (e.g., a big data warehouse).

In accordance with an embodiment, as shown in FIG. 4, after the system depicted in FIG. 3, source data is loaded into leaf nodes (in this case, nodes C and D), and then aggregated up to a higher level based upon metadata relationships between nodes at the leaf level and nodes at level 1, where such data can be kept as a partial sum, in those nodes at level 1.

For example, source data can be loaded into node C. Such source data can then be aggregated up into nodes 2 and 3 at level 1 (based upon the metadata relationships existing between node C and nodes 2 and 3), where such aggregations can be maintained as a partial sum values. After such source data has been aggregated from node C, the source data in node C can be discarded (indicated by the greyed out node) in order to ensure space for loading source data into additional nodes at the leaf level.

Further, in this example, source data can be loaded into node D. Such source data can then be aggregated up into node 2 level 1 (based upon the metadata relationships existing between node D and node 2), where such aggregation can be maintained as a partial sum value. After such source data has been aggregated from node D, the source data in node D can be discarded (indicated by the greyed out node) in order to ensure space for loading source data into additional nodes at the leaf level.

In accordance with an embodiment, then, a completed aggregation calculation can be stored in node 1 and level 1, since it has received the aggregations from the two nodes on which it depends. Additionally, now that node 2 has all aggregations from nodes A, B, C, and D, the node 2 can complete a partial sum calculation. Meanwhile, the aggregation calculation in node 3 at level 1 is not completed, since it has not received aggregations from all of the nodes from which it depends (i.e., nodes E and F, in addition to node C, from which node 3 is now storing a partial sum value).

Figure 5:
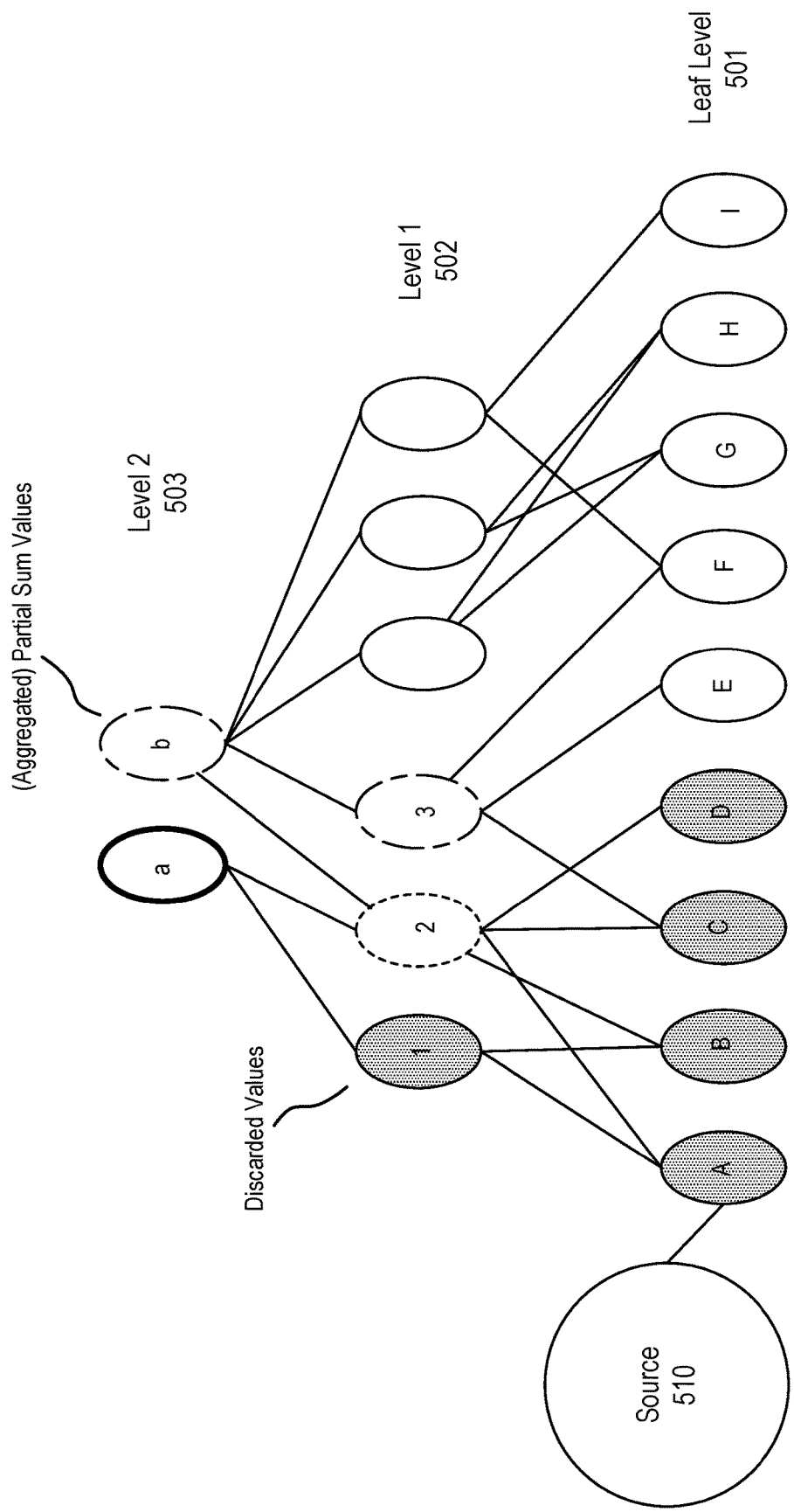
FIG. 5 illustrates a system for load, aggregate, and batch calculation in one scan in a multidimensional database environment, in accordance with an embodiment.

FIG. 5 illustrates a system for load, aggregate, and batch calculation in one scan in a multidimensional database environment, in accordance with an embodiment.

In accordance with an embodiment, as shown in FIG. 5, a data structure, such a multidimensional database structure, can comprise a number of node levels, such as a leaf level 501, level 1 502, and level 2 503, where each node level can comprise one or more nodes. The multidimensional database structure can be associated with a source 510, such as a data source (e.g., a big data warehouse).

In accordance with an embodiment, FIG. 5 represents a further iteration of the data structure shown in FIG. 4, where both nodes 1 and 2 at level 1 502 have complete aggregation and calculation values.

In accordance with an embodiment, the aggregated values and partial sums at nodes 1 and 2 at level 1 can be used for aggregation and calculation at node a at level 2.

In accordance with an embodiment, then, since the metadata associated with node 1 at level 1 indicates that its aggregation calculation is only used at node a at level 2, after the calculation has been completed at level 2, the aggregation calculation at node 1 at level 1 can be discarded.

In accordance with an embodiment, conversely, because the metadata associated with node 2 at level 1 indicates that its aggregation calculation is used at node a and node b at level 2, then after the calculation has been completed at node a at level 2, a partial sum value can be placed into memory at node b in level 2, the partial sum being associated with metadata indicating that the partial sum value originated at node 2 of level 1.

In accordance with an embodiment, such load, aggregation and discarding of source data at the nodes of the leaf level can continue, while aggregations, partial sums, and calculations are kept at higher node levels, such aggregations, partial sums, and calculations being associated with metadata representing relationships between various nodes at different levels of the data structure.

While the data structure shown in FIG. 5 only illustrates a 3 level data structure, in accordance with various embodiment, more or fewer levels are contemplated, wherein the aggregations and partial sum values at node levels higher than a leaf node level are associated with corresponding metadata relationships indicative of the source data at a leaf node in the leaf level.

Figure 6:
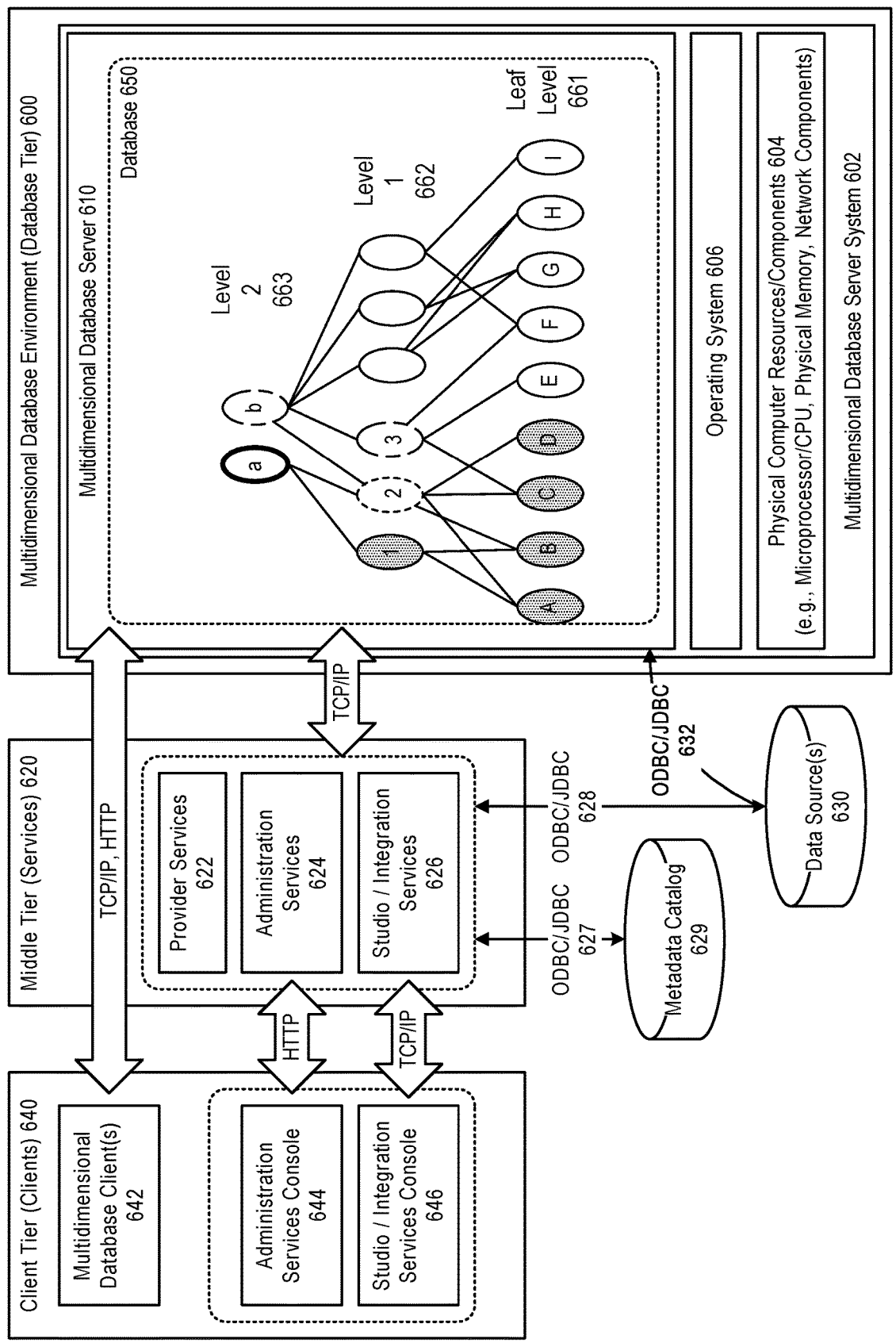
FIG. 6 illustrates a system for load, aggregate, and batch calculation in one scan in a multidimensional database environment, in accordance with an embodiment.

FIG. 6 illustrates a system for load, aggregate, and batch calculation in one scan in a multidimensional database environment, in accordance with an embodiment.

As illustrated in FIG. 6, in accordance with an embodiment, a multidimensional database environment, operating as a database tier, can include one or more multidimensional database server system(s) 602, each of which can include physical computer resources or components 604 (e.g., microprocessor/CPU, physical memory, network components), an operating system 606, and one or more multidimensional database server(s) 610 (e.g., Essbase Servers).

In accordance with an embodiment, a middle tier 620 can include one or more service(s), such as, for example, provider services 622 (e.g., Hyperion Provider Services), administration services 624 (e.g., Essbase Administration Services), or studio/integration services 626 (e.g., Essbase Studio/Essbase Integration Services). The middle tier can provide access, via ODBC/JDBC 627, 628, or other types of interfaces, to a metadata catalog 629, and/or one or more data source(s) 630 (for example, a relational database), for use with the multidimensional database environment.

In accordance with an embodiment, the one or more data source(s) can also be accessed, via ODBC/JDBC 632, or other types of interfaces, by the one or more multidimensional database server(s), for use in providing a multidimensional database.

In accordance with an embodiment, a client tier 640 can include one or more multidimensional database client(s) 642 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 644, or a studio/integration services console 646.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 650, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 6, which illustrates a database 650 in the form a hierarchical data structure having a number of levels 661-663. In accordance with an embodiment, each of the nodes at each level can be represented by a cell in a multidimensional database cube, with the relationships between nodes represented by metadata.

In accordance with an embodiment, a data from a data source 630 can be loaded in nodes at the leaf level 661 either via the middle tier 620, or directly from the data source.

Figure 7:
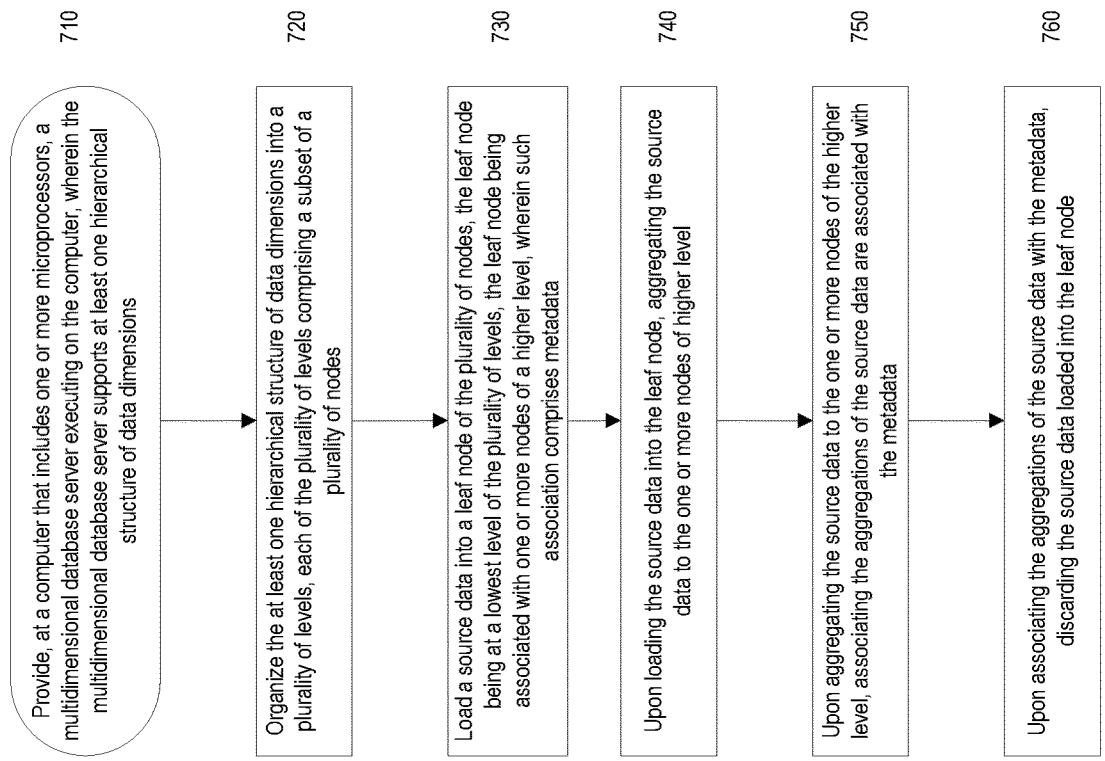
FIG. 7 is a flowchart of a method for load, aggregate, and batch calculation in one scan in a multidimensional database environment, in accordance with an embodiment.

FIG. 7 is a flowchart of a method for load, aggregate, and batch calculation in one scan in a multidimensional database environment, in accordance with an embodiment.

In accordance with an embodiment, at step 710, the method can provide, at a computer that includes one or more microprocessors, a multidimensional database server executing on the computer, wherein the multidimensional database server supports at least one hierarchical structure of data dimensions.

In accordance with an embodiment, at step 720, the method can organize the at least one hierarchical structure of data dimensions into a plurality of levels, each of the plurality of levels comprising a subset of a plurality of nodes.

In accordance with an embodiment, at step 730, the method can load a source data into a leaf node of the plurality of nodes, the leaf node being at a lowest level of the plurality of levels, the leaf node being associated with one or more nodes of a higher level, wherein such association comprises metadata.

In accordance with an embodiment, at step 740, upon loading the source data into the leaf node, the method can aggregate the source data to the one or more nodes of higher level.

In accordance with an embodiment, at step 750, upon aggregating the source data to the one or more nodes of the higher level, the method can associate the aggregations of the source data are associated with the metadata.

In accordance with an embodiment, at step 760, upon associating the aggregations of the source data with the metadata, the method can discard the source data loaded into the leaf node.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for loading data in a multidimensional database environment, comprising:
   a computer that includes one or more microprocessors and memory;
   a multidimensional database server executing on the computer, wherein the multidimensional database server supports a hierarchical structure of data dimensions wherein the hierarchical data structure comprises a plurality of nodes each associated with a portion of the memory;
   wherein the hierarchical structure of data dimensions is organized into a plurality of levels, each of the plurality of levels comprising a subset of the plurality of nodes;
   wherein the hierarchical data structure comprises a plurality of leaf nodes, each leaf node being at a lowest level of the plurality of levels, and each leaf node being associated with one or more nodes of a higher level, wherein such association comprises metadata;
   wherein the system is configured to iteratively load data for each particular leaf node of a plurality of leaf nodes by,
      loading source data into memory associated with said each particular leaf node of the plurality of leaf nodes,
      wherein, upon loading the source data into said each particular leaf node, the source data is aggregated to the one or more nodes of higher level, and
      wherein, upon aggregating the source data to the one or more nodes of the higher level, the aggregated source data is stored in memory associated with the one or more nodes of higher level as a partial sum, and the source data loaded into said each particular leaf node is discarded from the memory associated with said each particular leaf node.

2. The system of claim 1, wherein the system uses metadata to determine where the source data is aggregated to one or more nodes of higher level.

3. The system of claim 1, wherein the source data is loaded into said each particular leaf node via a middle tier associated with the multidimensional database, the middle tier providing access to the source data.

4. The system of claim 1, wherein the source data is loaded directly into said each particular leaf node via a communication protocol between the multidimensional database and the source data.

5. The system of claim 1,
   wherein prior to discarding the source data loaded into said each particular leaf node of the plurality of leaf nodes, the source data is loaded into a second leaf node of the plurality of leaf nodes, the second leaf node being associated with two or more nodes of a higher level;

wherein, upon loading the source data into the second leaf node, the source data is aggregated to a first of the two or more nodes of higher level associated with the second leaf node; and wherein upon aggregating the source data to the first of the two or more nodes of the higher level associated with the second leaf node, the source data at the second leaf node is maintained.

6. The system of claim 5, wherein upon aggregating the source data to each of the two or more nodes of the higher level associated with the second leaf node, the source data at the second leaf node is discarded.

7. A method for loading data in a multidimensional database environment, comprising:
providing, at a computer that includes one or more microprocessors and memory, a multidimensional database server executing on the computer, wherein the multidimensional database server supports a hierarchical structure of data dimensions wherein the hierarchical data structure comprises a plurality of nodes each associated with a portion of the memory;
organizing the hierarchical structure of data dimensions into a plurality of levels, each of the plurality of levels comprising a subset of the plurality of nodes, and wherein the hierarchical data structure comprises a plurality of leaf nodes at a lowest level of the plurality of levels, each leaf node being associated with one or more nodes of a higher level, wherein such association comprises metadata;
iteratively loading source data into each particular leaf node of the plurality of leaf nodes by,
loading source data into memory associated with said each particular leaf node of the plurality of leaf nodes,
aggregating the source data from said each particular leaf node one or more nodes of higher level,
storing the aggregated source data in memory associated with the one or more nodes of the higher level as a partial sum, and
discarding the source data from the memory associated with said each particular leaf node.

8. The method of claim 7, further comprising:
loading the source data into said each particular leaf node via a middle tier associated with the multidimensional database, the middle tier providing access to the source data.

9. The method of claim 7, further comprising using metadata to determine where the source data is aggregated to one or more nodes of higher level.

10. The method of claim 7, further comprising directly loading the source data into said each particular leaf node via a communication protocol between the multidimensional database and the source data.

11. The method of claim 7, wherein:
prior to discarding the source data loaded into said each particular leaf node of the plurality of leaf nodes, the source data is loaded into a second leaf node of the plurality of leaf nodes, the second leaf node being associated with two or more nodes of a higher level;
wherein, upon loading the source data into the second leaf node, the source data is aggregated to a first of the two or more nodes of higher level associated with the second leaf node; and
wherein upon aggregating the source data to the first of the two or more nodes of the higher level associated with the second leaf node, the source data at the second leaf node is maintained.

12. The method of claim 11, wherein upon aggregating the source data to each of the two or more nodes of the higher level associated with the second leaf node, the source data at the second leaf node is discarded.

13. A non-transitory computer readable storage medium having instructions thereon for loading data in a multidimensional database environment, which when read and executed cause a computer to perform steps comprising:
providing, at the computer that includes one or more microprocessors and memory, a multidimensional database server executing on the computer, wherein the multidimensional database server supports a hierarchical structure of data dimensions wherein the hierarchical data structure comprises a plurality of nodes each associated with a portion of the memory;
organizing the hierarchical structure of data dimensions into a plurality of levels, each of the plurality of levels comprising a subset of the plurality of nodes, and wherein the hierarchical data structure comprises a plurality of leaf nodes at a lowest level of the plurality of levels, each leaf node being associated with one or more nodes of a higher level, wherein such association comprises metadata;
iteratively loading source data into each particular leaf node of the plurality of leaf nodes by,
aggregating the source data from said each particular leaf node to one or more nodes of higher level,
storing the aggregated source data in memory associated with the one or more nodes of the higher level as a partial sum, and
discarding the source data from the memory associated with said each particular leaf node.

14. The non-transitory computer readable storage medium of claim 13, wherein the steps further comprise:
using metadata to determine where the source data is aggregated to one or more nodes of higher level.

15. The non-transitory computer readable storage medium of claim 13, wherein the steps further comprise:
loading the source data into said each particular leaf node via a middle tier associated with the multidimensional database, the middle tier providing access to the source data.

16. The non-transitory computer readable storage medium of claim 13, wherein the steps further comprise:
loading the source data directly into said each particular leaf node via a communication protocol between the multidimensional database and the source data.

17. The non-transitory computer readable storage medium of claim 16,
wherein prior to discarding the source data loaded into said each particular leaf node of the plurality of leaf nodes, the source data is loaded into a second leaf node of the plurality of leaf nodes, the second leaf node being associated with two or more nodes of a higher level;
wherein, upon loading the source data into the second leaf node, the source data is aggregated to a first of the two or more nodes of higher level associated with the second leaf node; and
wherein upon aggregating the source data to the first of the two or more nodes of the higher level associated with the second leaf node, the source data at the second leaf node is maintained.

* * * * *